United States Patent [19]

Hinz

[11] Patent Number: 5,288,807
[45] Date of Patent: Feb. 22, 1994

[54] VINYL MONOMER COMPOSITIONS WITH ACCELERATED SURFACE CURE

[75] Inventor: Frederick P. Hinz, Jeffersonville, Pa.

[73] Assignee: Rohm and Haas Company, Philadelphia, Pa.

[21] Appl. No.: 724,691

[22] Filed: Jul. 2, 1991

[51] Int. Cl.⁵ .................. C08F 279/02; C04B 7/02; C08L 51/04

[52] U.S. Cl. .................. 525/279; 525/245; 525/263; 525/289; 525/290; 525/292; 525/303; 525/304; 525/310; 525/316; 524/8; 524/785; 524/854; 524/853; 524/856; 106/719

[58] Field of Search .......... 525/245, 263, 289, 290, 525/292, 303, 304, 310, 316; 524/8, 785, 854, 856, 853; 106/719

[56] References Cited

U.S. PATENT DOCUMENTS

| | | | |
|---|---|---|---|
| 4,460,625 | 7/1984 | Emmons et al. | 526/230 |
| 4,721,757 | 1/1988 | Schindler | 525/245 |
| 4,835,027 | 5/1989 | Sudo et al. | 428/65 |
| 4,886,618 | 12/1989 | Novak et al. | 252/400.53 |
| 5,017,632 | 5/1991 | Bredow et al. | 523/412 |

FOREIGN PATENT DOCUMENTS 0182543  5/1986  European Pat. Off. .
1298275  6/1969  Fed. Rep. of Germany .

OTHER PUBLICATIONS

Flory, P. J. "Principles of Polymer Chemistry", Cornell University Pr, Ithaca, 1953 p. 56.

Primary Examiner—Vasu S. Jagannathan
Attorney, Agent, or Firm—Marvin J. Powell

[57] ABSTRACT

This invention relates to vinyl monomer compositions having accelerated surface cure characteristics. These compositions are prepared from a vinyl monomer or monomer mixtures such as blend of isobornyl methacrylate and hydroxypropyl methacrylate, a bulk phase polymerization catalyst system, a polyvalent metal oxidative surface phase catalyst, and a diolefin rubber dispersed in the vinyl monomer as a surface cure accelerator. These compositions are useful as sealers, healers and for polymer concrete.

23 Claims, No Drawings

VINYL MONOMER COMPOSITIONS WITH ACCELERATED SURFACE CURE

FIELD OF THE INVENTION

This invention relates to vinyl monomer compositions exhibiting accelerated surface cure characteristics. These compositions are prepared from a vinyl monomer or monomer mixture, such as a blend of isobornyl methacrylate and hydroxypropyl methacrylate, a bulk phase polymerization catalyst system, a polyvalent metal oxidative surface phase catalyst, and a diolefin rubber dispersed in the vinyl monomer as a surface cure accelerator. Compositions of this invention are useful as binders for polymer concrete and sealers for the restoration of cracked portland cement concrete surfaces referred to as sealer/healer.

BACKGROUND OF THE INVENTION

Vinyl monomer compositions which are polymerized in situ to form protective coatings are well known. For example, methyl methacrylate compositions have been widely studied as impregnates or sealers for concrete, and as binders for aggregate field polymer concrete compositions that are used in coating or patching portland cement based concrete. Concrete treated in this manner can be more resistant to abrasion and chemical spills than untreated concrete.

Vinyl monomers may be polymerized in bulk by free radical polymerization initiated by high energy radiation, particle beams or chemical sources of free radicals such as peroxides and hydro-peroxides. It is also well-known that free radical polymerization of vinyl monomers may be inhibited by oxygen. Oxygen inhibition on polymerization becomes particularly troublesome in surface coating compositions such as those used in protecting concrete surfaces. In situations involving compositions based on methyl methacrylate, the lack of surface curing is not particularly disadvantageous. Methyl methacrylate has significant vapor pressure, and uncured monomer on the surface of an otherwise polymerized composition volatizes relatively quickly, exposing the hard polymeric surface beneath.

However, when the uncured composition contains less volatile vinyl monomers, the surface of the composition which has been cured in bulk polymerization may be very slow to cure since the presence of oxygen inhibits surface curing. This results in a surface having such undesirable properties as tack and residual odor. Compositions containing less volatile monomers may be otherwise desirable because of enhanced chemical resistance, greater safety, reduced odor and lower cost.

A variety of techniques have been used in an attempt to resolve the problem presented by inhibition of polymerization by oxygen. For example, a polyvalent metal salt such as cobalt naphthenate may be included in the coating composition in order to catalyze the oxidative cure of the residual uncured monomer. Driers such as cobalt naphthenate are commonly used to promote thorough drying. Also, articles coated with vinyl monomer compositions can be cured under a blanket of nitrogen or other inert gas. In an alternative procedure to resolve the issue of the presence of oxygen, a second coating of a material such as paraffin which reduces oxygen penetration at the surface of applied vinyl monomer can also be used to ameliorate the situation.

None of these solutions to the problem arising from oxygen inhibition of surface cure has been totally satisfactory. There remains a significant need for vinyl monomer compositions which rapidly develop surface cure, especially in the case of compositions which contain relatively low volatile vinyl monomers.

SUMMARY OF THE INVENTION

It is an object of this invention to provide vinyl monomer compositions which have a surface that cures more quickly than prior art compositions when the surface of the vinyl monomer composition is exposed to oxygen. It is a further object of this invention to provide vinyl monomer compositions which show reduced tack when compared with commercially available compositions. Another object of this invention is to provide vinyl monomer compositions that may be formulated using a highly brittle low volatility monomer to achieve a relatively tack-free surface. Still another object of the current invention is to provide vinyl monomer compositions that have improved surface physical properties.

The vinyl monomer composition exhibiting improved cure in an oxygen containing environment will have a de-inhibiting amount of diolefin rubber dispersed in the vinyl monomer including at least one relatively low volatility vinyl monomer, wherein the diolefin rubber is insoluble in the vinyl monomer and at least one polyvalent metal catalyst.

DESCRIPTION OF THE PRIOR ART

U.S. Pat. No. 4,721,757 describes a vinyl monomer composition exhibiting accelerated surface cure. These compositions are prepared from a vinyl monomer or monomer mixture of dicyclopentenyloxyethyl methacrylate and hydroxypropyl methacrylate, a bulk phase polymerization catalyst system, a polyvalent metal oxidative surface phase catalyst and a diolefin rubber dispersed in the vinyl monomer as a surface cure accelerator.

U.S. Pat. No. 4,722,976 describes a thermoplastic macromonomer having a solid, linear polymer terminated at one or both ends with a functional group which is addition or condensation copolymerizable with a liquid comonomer component.

U.S. Pat. No. 4,426,504 describes an acrylic curable coating composition having dicyclopentenyl oxyethyl methacrylate, a linear polyalkylene glycol diacrylate or dimethacrylate cross-linking agent. The acrylic curable coating composition also contains conventional initiators and promoters.

DETAILED DESCRIPTION OF THE INVENTION

Compositions of this invention have a de-inhibiting amount of diolefin rubber dispersed in vinyl monomer including at least one relatively low volatility vinyl monomer, wherein the diolefin rubber is insoluble in the vinyl monomer and at least one polyvalent metal catalyst. It has been found that surface vinyl monomer compositions which contain diolefin rubber dispersed therein cure significantly more quickly than similar compositions which do not contain the dispersed diolefin rubber. Further, compositions of this invention containing diolefin rubber particles show an accelerated surface cure in comparison with analogous compositions which have non-olefin rubber polymeric particles dispersed instead of the olefin rubber particles. The acceleration of the surface cure of the vinyl monomer by the diolefin rubber is unexpected, and the mechanism of the acceleration is unknown.

The diolefin rubber is preferably present in the composition in the form of dispersed particles. The diolefin rubber may be in the form of a homopolymer of diolefin monomer or as a copolymer of diolefin monomers. Alternately, copolymers of diolefin monomer and copolymerizable nondiolefin monomer may be employed. Examples of diolefin monomers which may be used to prepare diolefin polymer are 1,3-butadiene, 2-chloro-1,3-butadiene, 2,3-dichloro-1,3-butadiene, 2-cyano-1,3 butadiene, 1,2,3,4-tetrachlorobutadiene, isoprene, 1,4-hexadiene and dicyclopentadiene. Diolefin rubber particles polymerized from monomer comprising at least about 60 percent by weight of total monomer selected from 1,3-butadiene, 2-chloro-1,3-butadiene, 2,3-dichloro-1,3-butadiene, 2-cyano-1,3-butadiene, 1,2,3,4-tetrachlorobutadiene, isoprene, 1,4-hexadiene and dicyclopentadiene are preferred: Homo- and copolymers of 1,3-butadiene are preferred. The diolefin rubber particles may be prepared by emulsion or suspension polymerization as is conventional in the rubber art. In addition, natural rubber latex may be used. Diolefin rubber particles which are insoluble yet swellable in the vinyl monomer are preferred. Thus, internally crosslinked diolefin rubber particles are preferred. The diolefin rubber particles must also be dispersible in the vinyl monomer. Polymer dispersion aids may be employed to disperse the diolefin rubber particles in the vinyl monomer. The diolefin rubber particles may be prepared by emulsion polymerization in multiple stages. It is preferred that at least a portion of the monomer used in either the second or latest stages of polymerization be selected to yield polymeric material which is compatible with the vinyl monomer employed in the composition of this invention. For example, when the vinyl monomer composition contains isobornyl methacrylate, the monomer used in the second stage of emulsion polymerization in the preparation of the diolefin rubber particles may be methyl methacrylate. Also, either the second or later stages may be graft polymerized to the first stage. Especially preferred are diolefin rubber particles disclosed in U.S. Pat. Nos. 3,671,610, 3,775,514 and 3,899,547; and by this reference is hereby incorporated herein. These patents disclose processes for preparing butadiene-styrene-methyl methacrylate copolymers by graft polymerizing, on crosslinked butadiene or polybutadiene-styrene copolymer latex, styrene, methyl methacrylate and copolymerizable crosslinking agent.

Other diolefin rubbers prepared by emulsion or suspension polymerization, such as chloroprene nitrilebutadiene rubber and styrene-butadiene rubber, may also be modified by graft polymerization of similarly compatible monomers to yield diolefin rubber particles which are dispersible in the vinyl monomer compositions of this invention. It is believed that such modified diolefin rubber particles have a core-shell structure; and that the shells of these particles comprise copolymer compatible with the monomer and either swell or partially dissolve in the monomer, thereby promoting dispersion of the particles in the monomer. However, this invention is not limited by the proffered explanation of the dispersion of these particles. Furthermore, any means of dispersing diolefin rubber particles in the monomer may be used to prepare the compositions of this invention. Preferred later stage monomers include styrene, methyl methacrylate and the ($C_2$–$C_8$) alkyl acrylates. The initial stage monomer and the later stage monomer may include from about 0.01 to 5 percent by weight of total monomer which is polymerized in the initial stage or later stage, respectively, of divinyl crosslinking agent. The divinyl crosslinking agent may be selected from divinyl benzene, diethylene glycol dimethacrylate, triethylene glycol dimethacrylate, tetraethylene glycol dimethacrylate, polyethylene glycol dimethacrylate, polypropylene glycol dimethacrylate and 1,3-butylene glycol dimethacrylate.

It is preferred that the weight ratio of the diolefin rubber particles to the vinyl monomer be from about 1:20 to 1:1. It is especially preferred that this weight ratio be from about 1:9 to 1:4. It is preferred that the ratio of the weight of diolefin monomer polymerized to yield the diolefin rubber particles to the total weight of monomer polymerized to yield these particles be at least about 0.4.

In addition to the diolefin rubber and low volatility vinyl monomer, compositions of the present invention must also contain at least one polyvalent metal catalyst to promote the oxidative cure of the vinyl monomer. Polyvalent metal oxidative cure catalysts are well known in the coating's art. The polyvalent metal oxidative cure catalyst may be any salt or complex of a polyvalent metal ion that catalyzes the oxidative curing of drying oils and when added to oil-based varnishes and paints, accelerates the drying or curing thereof. These metal salts or complexes are also known in the art as "siccatives" or "driers". Such substances include the polyvalent metal salts of higher aliphatic acids such as the butyrate, pentanoate, hexanoate, and especially the salts of higher aliphatic acids having from 8 to 30 carbon atoms or of naphthenic acids that provide solubility in the vinyl monomer. Generally, the most useful drier salts for the vinyl monomer compositions of the present invention are salts of naphthenic acids or of ($C_8$–$C_{30}$) aliphatic acids. Examples of the polyvalent metal include calcium, copper$^{II}$, zinc$^{II}$, manganese$^{II}$, manganese$^{III}$, lead$^{II}$, cobalt$^{II}$, iron$^{III}$, vanadium$^{II}$, and zirconium$^{IV}$. These salts or complexes accelerate the action of the organic hydroperoxide and promote oxidative curing in the organic peroxide-amine catalyst system. Other examples of the acid component or anion of the drier salt are those of resinic acids (that is, rosin acids), tall oil fatty acids, linseed oil fatty acids, 2-ethylhexanoic acid, lauric acid, palmitic acid, myristic acid, stearic acid, oleic acid, linoleic acid, linolenic acid, behenic acid, cerotic acid, montanic acid and abietic acid. A mixture of drier salts may be used.

Preferred polyvalent metal catalysts are the transition metal and alkaline earth naphthenates, octoates and acetylacetonates. Especially preferred drier salts are those of cobalt, vanadium and manganese, such as cobalt octoate, cobalt naphthenate, cobalt acetylacetonate, manganese octoate, manganese naphthenate, and manganese acetylacetonate and vanadium acetylacetonate. Para-dimethylamino benzaldehyde may also be used with drier salts to hasten surface curing, and compositions containing para-dimethylamino benzaldehyde and cobalt salts are preferred.

Flexibility enhancing monomers which are preferred are the ($C_8$–$C_{16}$) alkyl acrylates and ($C_8$–$C_{16}$) alkyl methacrylates. Multifunctional monomers which are preferred are the diacrylates, triacrylates, dimethacrylates and trimethacrylates. Hydroxy ($C_1$–$C_4$) alkyl acrylates and hydroxy ($C_1$–$C_4$) alkyl methacrylates may be referred to collectively as "hydroxyalkyl" monomers. It is preferred that the vinyl monomer of this invention contain from about 25% to 75% by weight of total vinyl monomer of isobornyl acrylate or methacrylate and from about 75% to 25% by weight of total vinyl monomer of hydroxyalkyl monomer. It is also preferred that the vinyl monomer contain from about 2% to 20% by weight of total vinyl monomer of multifunctional monomer. It is preferred that the vinyl monomer contain from about 2% to 35% by weight of the total monomer of the flexibilizing monomer.

An especially preferred monomer is isobornyl methacrylate. Especially preferred hydroxyalkyl monomers are hydroxyethyl methacrylate and hydroxypropyl methacrylate. An especially preferred multifunctional monomer is polyethyleneglycol [600] dimethacrylate. Especially preferred flexibilizing monomers are lauryl methacrylate and isodecyl methacrylate.

In using the compositions of this invention as surface coatings and polymer concrete binders and, in similar applications, it is necessary to provide some additional means of polymerizing the bulk of the vinyl monomer which is not sufficiently close to the surface of the composition to be effectively cured by the surface cure catalyst provided. The bulk may be polymerized by any of the methods which are known in the art as useful for polymerization of vinyl monomers. For example, the bulk may be cured by free radical polymerization. The free-radicals may be generated by thermal decomposition of an initiator species dispersed or dissolved in the composition, or they may be generated by exposing the composition to high energy radiation such as gamma radiation. Alternately, in the case of thin coating, a particle beam may be applied to the composition such as an electron beam. If an initiator species is employed, it may be used as an element of a polymerization catalyst system. For example, it may be used as part of an oxidation radiation catalyst system. The polymerization catalyst system may either initiate or catalyze the polymerization of the vinyl monomer employed in the compositions of this invention. Also, either multi-catalysts or initiators may be employed simultaneously.

A more preferable polymerization catalyst is a mixture of an organic peroxide and an aromatic amine. An especially preferable polymerization catalyst is a mixture of benzoyl peroxide and N,N-dimethyl p-toluidine. Aromatic amines may be used in small amounts with the organic peroxides and generally accelerate the action of the peroxide. For example, aniline, N,N-dimethylaniline, N,N-diethylaniline, toluidine, N,N-dimethyl p-toluidine, N,N-di(hydroxyethyl) toluidine and para-dimethylamino-benzaldehyde may be added for this purpose in an amount of about 0.1 to 5 percent by weight of the vinyl monomer composition. Para-dimethylamino benzaldehyde is preferred, especially when used in connection with a polyvalent metal oxidative cure catalyst such as cobalt naphthenate.

The addition of a polyvalent metal salt of complex, preferably with an organic peroxide in small amounts, can be made to the vinyl monomer composition prior to use. The proportion of metal salt or complex added to the composition before use may be from 0.0005 weight percent up to about 2 weight percent, and the amount of peroxide may be in the range of 0.1 to 3 weight percent based on the total weight of the monomers.

The compositions described in this invention may be hard and tough when cured. When it is desired to render such compositions more flexible, a small proportion of a drying oil such as linseed oil, as described above, or of an acrylic polymer having a low glass transition temperature (Tg), such as poly(ethylacrylate), poly(butylacrylate), or poly (2-ethylhexyacrylate), or a mixture of a drying oil and low Tg acrylic polymer, may be added to the composition and may replace part of the vinyl monomer. Alternatively, the vinyl monomers may be used with a small proportion of an auxiliary liquid monomeric acrylate and/or vinyl ester binder-forming material which is of low volatility and can reduce the hardness and impart a more flexible or resilient character to the final composition. A mixture of a drying oil and an auxiliary monomer may also be used.

Such other acrylic ester monomers include ($C_{10}$–$C_{30}$) alkyl or ($C_{12}$–$C_{30}$) alkyl acrylates or methacrylates such as lauryl acrylate, myristyl acrylate, palmityl acrylate, oleyl acrylate, linoleyl acrylate, linolenyl acrylate and stearyl acrylate. As stated above, the ($C_8$–$C_{16}$) alkyl acrylates and ($C_8$–$C_{10}$) alkyl methacrylates are preferred. Lauryl methacrylate and isodecyl methacrylate are similarly preferred.

Similar improvements in flexibility may be obtained by including the vinyl monomers long chain ($C_{12}$–$C_{30}$) aliphatic acid vinyl acid esters. For example, vinyl laureate, vinyl oleate, vinyl stearic or di ($C_4$–$C_8$) alkyl esters of maleic acid, fumaric acid, or itaconic acid, e.g., dibutyl, dihexyl, or dioctyl fumarate, maleate, or itaconate; as well as di(meth)acrylates of polyethers such as polyethylene glycol, polypropylene glycol, or polytetramethylene glycol.

When used as polymer concrete, the compositions of this invention may include pigments, fillers and other materials including aggregates, especially small-sized aggregates.

The aggregate that is mixed with the vinyl monomer can be any material whether capable of curing or not. Examples of inert materials are very small pebbles, sand or other so-called aggregate materials used in the making of concrete. The sand that may be used may be of any quality or size. Sand of small particle size such as "Ottawa" sand and "Best" sand or a mixture of the two may be used. Ottawa sand is a silica sand of the type referred to as "round". Best sand is of the type known as "sharp". In both cases, fines can be used. In general, however, the sieve size of the sand may vary over a fairly wide range. In lieu of or in addition to sand, it is possible to use ground glass, emery powder, ground slag, very fine gravel, trap rock and similar aggregates.

It is often advantageous to incorporate in the mixture, with or without sand, either a minor fraction of clay or a hydraulic cement; if this procedure is used, the clay may take the form of kaolin, china clay, porcelain clay, fire clay, pipe clay, Bentonite and, in fact, almost any of the known types of clay. Of course, other materials of small nature may be employed including broken clay products, marble chips, crushed stone and other typical aggregate materials used in the making of terrazzo floors or walls provided they are small in size in comparison with the pores to be filled. The hydraulic cement that may be employed includes portland cements of the various types; the white cements, the natural cements, pozzolanic cements, cements derived from industrial slags and "fly ash", aluminous cements and, in general, all of the commercially available hydraulic cements. Also included are hydraulic limes and similar materials of kinds well known to those skilled in the art.

In the following examples, illustrating but a few embodiments of the invention, the parts and percentages are by weight and the temperatures are in Celsius or Centigrade degrees unless otherwise stated.

The following abbreviations are used to designate the corresponding compounds and components.

IBOMA = isobornyl methacrylate
CHP = cumene hydroperoxide
HEMA = hydroxy ethyl methacrylate
HPMA = hydroxypropyl methacrylate
DMAB = N,N-dimethyl amino-para-benzaldehyde
2-EHA = 2-ethyl hexyl acrylate
MMA = methyl methacrylate
Rubber = methacrylate/butadiene/styrene
Sartomer 252 = polyethyleneglycol [600] dimethacrylate The following tests are employed to evaluate the physical properties of the cured substrates produced from the composition of the invention:

ZAPON TACK TEST

Fabrication and calibration of tack tester

A 1-inch (2.54 cm) wide strip of aluminum (0.00025 inches or 0.0064 cm thick) is cut and bent so that a 1 inch (2.54 cm) square area will rest flat on a tack-free surface when a five gram weight is placed in the center of the area, but falls over with a lighter weight.

Testing for Zero Gram Zapon Tack Free

The tack tester is placed on the film with no additional weight on the 1 inch square area resting on the film, and restrained from falling over for five seconds as its weight presses down on the film. Then the tester is released. If it falls over within five seconds, the film passes the "zero gram Zapon test."

Testing for 500 Gram Zapon Tack Free

Similar to the zero gram test except that a 500 gram weight is placed in the center of the 1 inch square area for five seconds, pressing the tester on the film with additional force. The film passes if the tester falls over within five seconds after removing the weight.

Set-To-Touch Cure Test

The film is judged "set-to-touch" when liquid is not transferred to an object which lightly touches the film. The rubber portion of an eye-dropper is used to touch the film.

Dispersions of rubber particles in vinyl monomer mixtures are prepared by adding the rubber particles to the vinyl monomer with agitation using a propeller mixture, giving opaque but macroscopically uniform, nonsettling dispersions.

TABLE I

Effect of Rubber on Surface Cure

| | Diene[1] | IBOMA | HPMA | DMABA | 500 g Zapon |
|---|---|---|---|---|---|
| Control | 0% | 48.0% | 48.0% | 4% | 600 min. |
| Sample 1 | 5 | 45.5 | 45.5 | 4 | 315 |
| Sample 2 | 10 | 43.0 | 43.0 | 4 | 265 |
| Sample 3 | 15 | 40.5 | 40.5 | 4 | 220 |
| PCM-1100 commercial[2] | | | | | 310 (0 g Zapon) |

[1]Diolefin Rubber
[2]PCM 1100 is a commercial high molecular weight methacrylate monomer (HMWM) used as a binder for polymer concrete and a penetrating sealer for restoration of Portland cement concrete.

The above data shows that as the level of diolefin rubber increases in the monomer blend, the faster the rate of surface cure when compared to the commercially available product. Therefore, the rubber dramatically accelerates the rate of surface cure.

TABLE II

Effect of the Long Chain Alkyl Methacrylate on Polymerization IBOMA

| Diene[1] | IBOMA | HPMA | LMA | Cobalt | DMABA | HPMA residual | IBOMA residual |
|---|---|---|---|---|---|---|---|
| 10% | 43% | 43% | 0% | 0.05% | 4% | 0.37% (of total polymer) | 3.03% |
| 10 | 43 | 43 | 0 | 0.12 | 4 | 0.27 | 2.28 |
| 10 | 33 | 33 | 20 | 0.05 | 4 | 0.14 | 0.39 |
| 10 | 33 | 33 | 20 | 0.12 | 4 | 0.32 | 0.38 |

[1]Diolefin Rubber

Table II shows that the presence of a long chain alkyl methacrylate monomer such as LMA (lauryl methacrylate) in the monomer blend, when used as a polymer concrete binder, maximizes the polymerization of the monomer. The absence of residual monomer improves the strength of the binder, while substantially minimizing environmental concerns.

The residual monomer was measured by a gas chromatograph after the initiated monomer blend was allowed to cure for 7 days. The polymer was swelled in acetone to extract the monomer.

TABLE III

Effect of Sartomer 252 on Flexibilizing IBOMA

| IBOMA | HPMA | LMA | Sart 252 | Diene[1] | DMABA | Strain | Flexural Stress | Properties Modulus |
|---|---|---|---|---|---|---|---|---|
| 25% | 36% | 20% | 0% | 15% | 4% | 0.33% | 5840 psi | 1.91 MM psi |
| 25 | 26 | 20 | 10 | 15 | 4 | 0.64 | 5190 | 1.31 |
| 40 | 21 | 20 | 0 | 15 | 4 | 0.21 | 4060 | 1.98 |
| 40 | 11 | 20 | 10 | 15 | 4 | 0.39 | 4710 | 1.47 |
| PCM-1100 commercial[2] | | | | | | 0.58 | 4630 | 1.32 |

[1]Diolefin Rubber
[2]PCM 1100 is a commercial high molecular weight methacrylate monomer (HMWM) used as a binder for polymer concrete and a penetrating sealer for restoration of Portland cement concrete.

Table III shows that the addition of a long chain difunctional methacrylate monomer could be added to the monomer blend to produce the desired flexibility as shown by composition 2 in the table above.

TABLE IV

Effect of Sartomer 252 on Exposure Performance of IBOMA

| Sample | A | B | C | PCM-1100 |
|---|---|---|---|---|
| Isodecyl Methacrylate | 35 | 30 | — | Commercial |
| Lauryl Methacrylate | — | — | 20 | Product |

TABLE IV-continued

Effect of Sartomer 252 on Exposure Performance of IBOMA

| Sample | A | B | C | PCM-1100 |
|---|---|---|---|---|
| Isobornyl Methacrylate | 20 | 20 | 25 | |
| Hydroxypropyl Methacrylate | 26 | 26 | 26 | |
| Sartomer 252 | — | 5 | 10 | |
| Dimethylaminobenzaldehyde | 4 | 4 | 4 | |
| Acryloid BTA-III-N2 | 15 | 15 | 15 | |
| Properties | | | | |
| Cracking | 7 | 10 | 10 | 10 |
| Delamination | 10 | 10 | 10 | 10 |
| Chalking | 3 | 3 | 3 | 3 |
| Erosion | 9 | 8 | 6 | 3 |
| Appearance | 9 | 8 | 5 | 3 |

Rating Scale:
10 = Excellent, no failure
0 = Complete failure

Rating of Polymer Concrete Overlays on Concrete Blocks After Nine Months Exterior Exposure Table IV results indicate that without the Sartomer 252, the overlay is subject to surface cracking relative when compared to the commercial control but is equivalent or superior to the commercial system in every other regard.

The polymer concrete compositions of Table IV contained 13% monomer blend as binder and 87% filler—principally sand. The actual filler composition is presented below:

| Component | Parts by Weight |
|---|---|
| No. 2 Sand | 40.70 |
| No. 45 Sand | 40.70 |
| Silica flour 120 | 17.19 |
| Black iron oxide Pfizer BK-5099 | 0.05 |
| Titanium Dioxide Dupont R-960 | 0.45 |
| Benzoyl Peroxide Cadox BFF-50, 50% | 0.71 |
| Cobalt Neodecanoate Mooney Catalyst 4142 11.2% active cobalt | 0.20 |

I claim:

1. A vinyl monomer composition exhibiting improved cure in an oxygen-containing environment comprising (1) a de-inhibiting amount of from about 5% to about 15% weight percent of diolefin rubber dispersed in monomer comprising isobornyl methacrylate having a partial pressure less than about 1 millimeter of mercury at 50° C., (2) a multifunctional monomer selected from the group consisting of diacrylates, triacrylates, dimethacrylates, and (3) a catalyst consisting of at least one polyvalent cobalt salt, wherein (a) said diolefin rubber is polymerized in at least two stages including an initial stage and a subsequent stage, said initial stage comprising polymerizing a diolefin monomer selected from the group consisting of 1,3-butadiene, 2-chloro-1,3-butadiene, 2,3-dichloro-1,3-butadiene, 2-cyano-1,3-butadiene, 1,2,3,4-tetrachlorobutadiene, isoprene, 1,4-hexadiene and dicyclopentadiene, and said subsequent stage comprising polymerizing a monomer selected from the group consisting of styrene, methyl methacrylate and ($C_2$–$C_8$) alkyl acrylate, and (b) said diolefin rubber is insoluble in said vinyl monomer composition.

2. The composition of claim 1 wherein said diolefin rubber is dispersed as diolefin rubber particles.

3. The composition of claim 2 wherein said diolefin rubber particles are polymerized from monomer comprising at least about 60 percent by weight of total monomer of diolefin monomer selected from the group consisting of 1,3-butadiene, 2-chloro-1,3-butadiene, 2,3-dichloro-1,3-butadiene, 2-cyano-1,3-butadiene, 1,2,3,4-tetrachlorobutadiene, isoprene and dicyclopentadiene.

4. The composition of claim 3 wherein said diolefin rubber particles are polymerized from monomer comprising at least about 50% by weight of 1,3-butadiene.

5. The composition of claim 3 wherein the initial stage is polymerized by emulsion polymerization.

6. The composition of claim 2 wherein the weight ratio of said diolefin rubber particles to said vinyl monomer composition is from about 1:20 to 1:1.

7. The composition of claim 6 wherein the weight ratio of said diolefin rubber particles to said vinyl monomer composition is from about 1:9 to 1:4.

8. The composition of claim 2 wherein the ratio of the weight of diolefin monomer polymerized to yield said diolefin rubber particles to the total weight of monomers polymerized to yield said particles is at least about 0.4.

9. The composition of claim 1 wherein at least one of the initial and subsequent stages additionally comprise from about 0.01 to 5 percent by weight of a divinyl crosslinking agent based on the total weight of monomer which is polymerized during said stage.

10. The composition of claim 9 wherein said divinyl crosslinking agent is selected from the group consisting of divinyl benzene, diethylene glycol dimethacrylate, triethylene glycol dimethacrylate, polyethylene glycol dimethacrylate, polypropylene glycol dimethacrylate and 1,3-butylene glycol dimethacrylate.

11. The composition of claim 1 wherein said component (1) additionally comprises at least one hydroxyalkyl monomer selected from the group consisting of the hydroxy ($C_1$–$C_4$) alkyl acrylates and methacrylates.

12. The composition of claim 11 wherein said hydroxyl alkyl monomer is selected from the group consisting of hydroxyethyl methacrylate and hydroxypropyl methacrylate.

13. The composition of claim 1 wherein said component (1) additionally comprises at least one flexibilizing monomer selected from the group consisting of ($C_8$–$C_{16}$) alkyl acrylates and methacrylates.

14. The composition of claim 13 wherein said flexibilizing monomer is selected from the group consisting of lauryl methacrylate and isodecyl methacrylate.

15. The composition of claim 1 wherein the multifunctional monomer is a polyethylene glycol dimethacrylate.

16. The composition of claim 1 additionally comprising a polymerization catalyst dispersed in said vinyl monomer composition, wherein said polymerization catalyst comprises at least one free radical initiator.

17. The composition of claim 16 wherein said polymerization catalyst additionally comprises at least one cure promoter selected from the group consisting of para-dimethylaminobenzaldehyde and N,N-dimethyl-para-toluidine.

18. The composition of claim 17 wherein said cure promoter is para-dimethylaminobenzaldehyde.

19. The composition of claim 16 wherein said free radical initiator is selected from the group consisting of cumene hydroperoxide and benzoyl peroxide.

20. The composition of claim 1 wherein said polyvalent metal catalyst is selected from the group consisting of cobalt naphthenate, cobalt octoate, cobalt acetylacetonate, and cobalt neodecanoate.

21. A sealer composition for concrete comprising the vinyl monomer composition of claim 1.

22. A healer composition for concrete comprising the vinyl monomer composition of claim 1.

23. A concrete binder composition for polymer concrete comprising the vinyl monomer composition of claim 1.

* * * * *